United States Patent [19]

Washburn

[11] Patent Number: 5,085,804
[45] Date of Patent: Feb. 4, 1992

[54] REFRACTORY ELECTRICAL DEVICE

[75] Inventor: Malcolm E. Washburn, Princeton, Mass.

[73] Assignee: Norton Company, Worcester, Mass.

[21] Appl. No.: 659,648

[22] Filed: Feb. 25, 1991

Related U.S. Application Data

[60] Division of Ser. No. 258,307, Oct. 14, 1988, which is a continuation-in-part of Ser. No. 120,291, Nov. 13, 1987, abandoned, which is a continuation-in-part of Ser. No. 669,399, Nov. 8, 1984, abandoned.

[51] Int. Cl.$^5$ ................................................. H01B 1/18
[52] U.S. Cl. ..................................... 252/516; 252/518; 501/92; 501/96; 501/97; 219/553; 219/270
[58] Field of Search ..................... 501/88, 89, 92, 96, 501/98, 97; 252/516, 518; 219/548, 553, 270

[56] References Cited

U.S. PATENT DOCUMENTS

| | | | |
|---|---|---|---|
| 3,246,275 | 4/1966 | Schrewelias | 501/92 |
| 3,252,827 | 5/1966 | Rose et al. | 117/201 |
| 3,649,310 | 3/1972 | Yates | 501/89 |
| 3,813,252 | 5/1974 | Lipp | 252/520 |
| 3,875,476 | 4/1975 | Crandall et al. | 317/98 |
| 3,875,477 | 4/1975 | Fredriksson | 317/98 |
| 3,890,250 | 6/1975 | Richarson | 252/516 |
| 3,926,857 | 12/1975 | Matkin et al. | 501/92 |
| 3,974,106 | 8/1976 | Richerson | 252/516 |
| 4,120,827 | 10/1978 | Boos et al. | 501/88 |
| 4,174,971 | 11/1979 | Schrewelius | 106/44 |
| 4,184,882 | 1/1980 | Lange | 501/92 |
| 4,335,217 | 6/1982 | Hatta et al. | 501/92 |
| 4,486,651 | 12/1984 | Atsumi et al. | 252/518 |

FOREIGN PATENT DOCUMENTS

| | | | |
|---|---|---|---|
| 1058673 | 7/1979 | Canada | 309/96 |
| 0027653 | 2/1985 | Japan | 501/89 |
| 0936118 | 9/1963 | United Kingdom | 501/92 |

Primary Examiner—Karl Group
Attorney, Agent, or Firm—Arthur A. Louiselle, Jr.

[57] ABSTRACT

The present invention is an electrical device made up of a mixture of silicon carbide and molybdenum disilicide, and may include silicon nitride or aluminum nitride or boron nitride. An electrical device is also disclosed which is particularly suited for use as an igniter in liquid and gas fuel burning systems. The device is made up of a sintered, preferably hot-pressed, mixture of fine powders of aluminum nitride or silicon nitride, silicon carbide and molybdenum disilicide where, when all three are present, they are present in substantial quantities.

11 Claims, 2 Drawing Sheets

REFRACTORY ELECTRICAL DEVICE

This is a divisional of copending application Ser. No. 07/258,307 filed on Oct. 14, 1988 which is a continuation-in-part application of application Ser. No. 07/120,291 filed Nov. 13, 1987 which in turn is a continuation-in-part of application Ser. No. 06/669,399 filed Nov. 8, 1984, now abandoned.

TECHNICAL FIELD

The invention is concerned with ceramic or refractory electrical devices and their particular utility as heating elements, igniters, and heat sensors.

BACKGROUND AND INFORMATION DISCLOSURE STATEMENT

The following patent publications are representative of the most relevant prior art known to the Applicant at the time of filing of the application.

U.S. PATENTS

| UNITED STATES PATENTS | | |
|---|---|---|
| 3,252,827 | May 24, 1966 | C. G. Rose et al |
| 3,649,310 | March 14, 1972 | P. C. Yates |
| 3,813,252 | May 28, 1974 | A. Lipp |
| 3,875,476 | April 1, 1975 | W. B. Crandall et al |
| 3,875,477 | April 1, 1975 | J. I. Fredriksson et al |
| 3,890,250 | June 17, 1975 | D. W. Richerson |
| 4,174,971 | November 20, 1979 | N. G. Schrwelius |
| 4,205,363 | May 27, 1980 | C. J. Boos et al |
| FOREIGN PATENTS | | |
| 1,058,673 | July 17, 1979 | Canada |

The utility of ceramic or refractory compositions for electrical devices such as resistors has been known for many years. Silicon carbide heating elements have found widespread use. In more recent years, primarily as a result of the so-called energy crunch, attention has been focused on the application of ceramic resistors as igniters in, for example, gas fired furnaces and appliances like stoves and clothes driers. An example of such an igniter is taught in U.S. Pat. No. 3,875,477. The igniter is mainly composed of 95 to 99.9% by weight of silicon carbide and 0.05 to 0.50% by weight of aluminum, with optional minor quantitites of silica and iron. The terminal connecting ends, or so-called cold ends, are formed in the conventional manner by metal coating said ends by dipping in a molten metal or flame spraying. These igniters are relatively low density bodies as a result of the process used to fabricate them viz. slip casting. Therefore they are susceptible to degradation.

An earlier approach to protecting very porous (35% by volume) silicon carbide type heating elements from oxidative degradation is that taught by U.S. Pat. No. 3,252,827. This is accomplished by first forming a porous self-bonded silicon carbide rod which is then immersed in an aqueous suspension of finely divided molybdenum disilicide for a sufficient amount of time to allow the molybdenum disilicide particles to fully penetrate the silicon carbide body and coat the walls of the pores contained therein. The body is then fired in an inert atmosphere to sinter the silicide to form the final coating. Ten to twenty five percent molybdenum disilicide can be used. While this approach is effective for a relatively large body such as a heating element e.g. having a diameter of 0.5 inch (1.27 cm) or larger, they are porous and therefore relatively mechanically weak. Therefore the teachings of this patent would not produce a commercially acceptable product where the product must have a small cross section of, for example, an igniter such as that of U.S. Pat. No. 3,875,477 with a cross sectional area of from 0.012 to 0.072 in$^2$ ($0.77 \times 10^{-3}$ to $0.46 \times 10^{-2}$ cm$^2$). The composition of U.S. Pat. No. 3,252,827 would result in an igniter that would simply be too fragile for practical use.

U.S. Pat. No. 4,174,971 offers a solution to the problem of relatively weak heating elements and the like. This reference impregnates a silicon carbide body with what is referred to as a molybdenum-silicon alloy which finally ends up as 25% of the structure; the impregnant is made up of about 50% by weight of silicon and 50% by weight of molybdenum disilicide.

High strength refractory resistor compositions are taught by U.S. Pat. No. 3,890,250. The product is composed of from 50 to 90% by weight of silicon nitride and 10 to 50% by weight of silicon carbide and has a modulus of rupture in excess of 100,000 psi (689 MPa) at 20° C. as measured by four point loading. The electrical resistivity varies from 1 to $1 \times 10^7$ ohm cm. These high strength characteristics are the result of hot-pressing the mixture of powders which brings about almost complete densification. However, when this material is used as an igniter the hot zone degrades rather quickly e.g. goes from a resistance of 182.4 to 247.4 ohms after only 311 hours at 1200° C. and the cold ends or tabs from 40.4 ohms to 154.4 ohms.

A dense submicron grained silicon carbide-aluminum nitride body is disclosed by U.S. Pat. No. 3,649,310 which is suitable for use as a heating element, amongst other things. The composition may also contain up to 80% of boron carbide, alumina and silicon nitride. The product is made by hot-pressing a mixture of submicron sized aluminum carbide and silicon nitride at about 2000° C. The two materials react with each other to form a mixture of submicron particles of aluminum nitride and silicon carbide. The resulting material has a density close or equal to theoretical density.

U.S. Pat. No. 3,875,476 specifically teaches a heat resistant ceramic electrical igniter which is composed principally (25-88%) of silicon carbide and a pyrex glass bond (5-30%); the composition may also include 1-8% ferro-silicon, 1-10% titania, 1-20% zirconia, and 5-30% silica. While not discussed in detail and not included as an example, the reference states that there are other possible mixtures of components including some containing molybdenum disilicide MoSi$_2$. In order to keep the terminal ends cool, the igniter of this patent has a composition, based on the above compounds, which varies from one with a relative high resistance in the center or hot-zone to one with substantially lesser resistance in the terminal ends. To avoid problems resulting from significantly different coefficients of thermal expansion, the reference employs several compositions going from the hot-zone to the terminal ends so that there is a gradual compositional transition and a resulting gradual transition in the coefficient of thermal expansion of the various portions of the igniter. This eliminates premature cracking of the igniter as a result of dramatically different thermal expansion characteristics. While the reference does not limit the configuration of the igniter, i.e. apparently the igniter may take any known shape, what is shown is a U-shaped device with the ends of the legs of the U being the terminal connector ends. The shape could of course be straight or more complexly configured as shown in Canadian Patent No. 1,058,673 and U.S. Pat. No. 3,875,477.

A complex refractory composition is the subject of U.S. Pat. No. 3,813,252. The sintered refractory material is made up of 10-20% of boron nitride with 20-80% of the remainder being selected from the group consisting of aluminum nitride, aluminum boride and silicon nitride, and 20-80% of that remainder being selected from the group consisting of graphite, boron carbide, titanium carbide, zirconium carbide, chromium carbide, silicon boride, beryllium boride, magnesium boride and calcium boride. The closest this teaching comes to the present invention is a mixture of boron nitride, aluminum nitride (or silicon nitride) and silicon carbide. What is missing is the all important molybdenum disilicide.

Another igniter for stove top burners which utilize gas is that described by U.S. Pat. No. 4,205,363. The igniter is composed essentially of silicon carbide, i.e. at least 95% silicon carbide and up to 5% of a negative doping agent in the form of such elements as nitrogen, phosphorus, arsenic, antimony and bismuth. The igniter can have a ratio of room temperature resistivity to resistivity at 1200° C. of less than 12 to 1 and preferably less than 9 to 1. By contrast, the present invention igniter can be formulated to have such a ratio as high as 19.8 but more importantly as low as 0.2. Heat up time, as is well known, is critical to the successful and safe use of a resistance igniter for the purpose of igniting gas. The reference discloses response times, i.e. time for the igniter to reach about 1250° C. from room temperature, in 2 or 3 seconds. To accomplish this rapid response time the igniter must be made very small in cross-section, more specifically, a cross section of 0.0002 to about 0.004 square centimeters. Thus the resulting igniter is essentially a silicon carbide hair or filament which is in turn extremely fragile. The invention igniter does not possess that shortcoming.

Lastly, Canadian Patent No. 1,058,673 discloses a complexly shaped igniter element wherein the hot-zone is made up essentially of recrystallized silicon carbide and the hot-zone includes a continuous groove therein. The silicon carbide contains an electrical resistivity modifying agent such as aluminum oxide, molybdenum disilicide, magnesium fluoride, magnesium chloride or magnesium titanate or a combination of these compounds. The quantity of electrical resistivity modifier to be added, according to the patent is about 10% by weight although as much as 25% alumina in the silicon carbide is taught. Silicon nitride is also mentioned as another electrical resistivity modifying agent usable to change the resistance of the shape and to impart desirable physical properties to the igniter.

The principal differences between the present invention and the prior art are the superiority of the invention resistor, particularly when utilized as an igniter, and the novel composition thereof which is what produces the superior results.

DISCLOSURE OF THE INVENTION

The total structure developed in the refractory body of the invention is essentially that of 2 separate but intertwined structures with one structure being contained within the other structure. FIGS. 1 and 2 are SEM's taken at 2000× of polished sections of two different mixtures showing similar structures of a dark gray continuous phase and a light gray continuous phase, with continuities being made 3 dimensionally. The dark gray structure is a dense nitride that is strong and rigid with connecting paths up to about 10 microns in width. The light gray structure is a dense continuous structure that because of its softer nature at elevated temperature has flowed into the interstices of the rigid structure.

FIG. 1 shows an example of a 50 volume % aluminum nitride rigid structure with a 50 volume % $MoSi_2$ and SiC electrically conductive structure with 30 volume % $MoSi_2$ and 20 volume % SiC. FIG. 2 shows a 60 volume % AlN rigid structure with 40 volume % of the mixture of $MoSi_2$ and SiC where the $MoSi_2$ is 15 volume % and the SiC is 25 volume %.

X-ray diffraction patterns show three distinct and well defined phases of AlN, $MoSi_2$ and SiC with no additional phases. The light gray phase is seen in FIG. 3 as an SEM taken at 17000× and shows sharp definition between the dark SiC and AlN structure and the light grey $MoSi_2$. While the preferred compositions incorporate silicon carbide, molybdenum disilicide and a nitride, compositions of from 5% to 50% by volume of molybdenum disilicide and 50% to 95% by volume of silicon carbide are also within the concept of the present invention.

It is believed that an essential feature of this type of total structure is that even though there is intimate contact between the two intertwined structures there is no or very little chemical reaction between or diffusion of cations from one structure to the other. This has been shown by EDAX analysis in the AlN; $MoSi_2$ and SiC system. Because of this, each structure can contribute its distinctive properties to the total system without interference of an undesired phase between the two structures. In this way the total system can have special characteristics because of interplay of properties. An example would be to select structures with different thermal expansions in which the metallic structure would put the brittle structure into compression for increased toughness of the total system. Another example would be a relatively softer metallic structure to act as an energy absorber for improved impact resistance. Another example would be for a strong high temperature resistant structure to act as a reinforcement for a structure that would be weak or soft at high temperature. Another important example would be as a strong high temperature electrically, non conductive structure to act as a reinforcement for an electrically conductive structure that can be varied in its electrical characteristics as desired.

The strong rigid structure may be made from nitrides such as $Si_3N_4$, AlN, or BN or combinations. In the case of $Si_3N_4$, a sintering aid would be required to achieve high density but no sintering aid would be necessary for AlN.

The electrically conductive structure may have varying ratios of $MoSi_2$ and SiC to vary both the magnitude and the nature of the conductivity. For example, ratios that are high in $MoSi_2$ are low in resistivity and ratios that are low in $MoSi_2$ are high in resistivity. When the ratio of $MoSi_2$ to SiC is higher than 0.65 in a composition containing 60 volume % AlN, the resistivity at elevated temperatures is higher than the resistivity at room temperature. The slope of the resistivity curve with temperature is positive similar to that of metallic conduction. When the ratio is less than 0.65 in the 60 volume % AlN composition, the resistivity curve has a negative slope similar to that of a semiconductor such as SiC. When the ratio equals 0.65, the slope is zero and the hot resistivity is equal to the cold resistivity. Table I shows summarized data of electrical igniters made from various mixtures of AlN, MoSi$_2$ and SiC.

FIG. 4 shows the relationship of the slope of the resistivity curve, and the ratio of MoSi$_2$ to SiC for a semilog curve with the equation as shown. With a composition based on 50 volume % AlN instead of 60 volume %, the ratio of MoSi$_2$ to SiC is 0.33 when the slope is equal to zero.

A main feature of the embodiment of this invention which is an electrical igniter for fluid fuels i.e. gas and liquid fuels, is that both the magnitude of resistivity and the slope of the resistivity curve may be controlled by varying the two structures with these three ingredients. Increases in the nitride structure will result in increases in the magnitude of the resistivity and vice versa. Increases in the ratio of MoSi$_2$ and SiC in the conductive structure will result in decreases in the ratio of cold resistivity to hot resistivity. These decreases in turn, result in decreases in the response time of the igniter.

FIG. 5 shows the relationship of the ratio of cold resistivity to hot resistivity with the ratio of MoSi$_2$ to SiC. In a composition with 60 volume % AlN, resistivity ratios of 5 or less would be at MoSi$_2$:SiC ratios of 0.33 or greater. Similarly in a composition with 50 volume % AlN for a resistivity of 5 or less the MoSi$_2$:SiC would be 1.8 or greater.

1200° C. as low as 0.2 result from a sintered or hot-pressed volume percent mixture of from 30% to 70% of a nitride of aluminum, silicon, or boron; 10% to 45% of silicon carbide; 5% to 50% of molybdenum disilicide; and 0 to 3% of a sintering aid such as a source of magnesium oxide; which has been hot-pressed or sintered to a density of at least 85% of theoretical density. The most preferred igniter contains 4% or less of open porosity. Thus the operable ranges for the materials making up the present invention are 5 to 50% by volume of molybdenum disilicide and 50 to 95% by volume of silicon nitride. Sintering or pressing aids such as magnesium carbonate are well known and while the use of such a material is not always necessary, it always is advantageous to the processing and the end product, to utilize such a material. All percentages recited herein are volume percentages unless otherwise indicated.

The following material densities were used to calculate weight percentages from volume percentages:

| | |
|---|---|
| Si$_3$N$_4$ | 3.20 Mg/m$^3$ |
| AlN | 3.26 |
| MoSi$_2$ | 6.26 |
| SiC | 3.20 |

Theoretical densities were determined from the mate-

TABLE I

| | Example # | | | | | | |
|---|---|---|---|---|---|---|---|
| | III | IV | V | VI | VII | VIII | IX |
| AlN, Vol % | 60 | 60 | 60 | 50 | 60 | 60 | 50 |
| MoSi$_2$, # | 5 | 7.9 | 10 | 12.5 | 15 | 20 | 30 |
| SiC, # | 35 | 32.5 | 30 | 37.5 | 25 | 20 | 20 |
| Density, % Theor. | 96.1 | 92.9 | 95.9 | 96.1 | 95.5 | 91.1 | 99.0 |
| Resistivity; 52 cm (R) | | | | | | | |
| Measured, 30° | 89.8 | 70 | 5.22 | .27 | .33 | .0029 | .0006 |
| Measured, 1200° | 12.8 | — | 1.03 | .24 | .12 | .019 | .0035 |
| Calculated, 30°* | 214 | 27.2 | 6.12 | — | .18 | .0050 | — |
| Calculated, 1200°** | 10.8 | 3.06 | 1.23 | — | .14 | .016 | — |
| Ratio, $R_{30}$:$R_{1200}$ | 19.8 | 8.9 | 5.0 | 1.1 | 1.3 | .3 | .2 |
| Slope*** ($\times 10^{-3}$) | −2.55 | −1.87 | −1.37 | −.10 | −.21 | +.99 | +1.5 |
| Ratio, MoSi$_2$:SiC | .143 | .246 | .333 | .333 | .60 | 1.0 | 1.5 |

*$R_{30} = 7457.3 \times E(-.7105 \times M)$ correlation coefficient = .984
**$R_{1200} = 94.244 \times E(-.4338 \times M)$ correlation coefficent = .997
***$R_T = A \times E(B \times T)$
SemiLog curves where:
R = Resistivity
M = Vol % MoSi$_2$
T = Temperature
E = Natural logarithm
A = Intercept
B = Slope The major disadvantages possessed by prior art ceramic electrical resistors, particularly igniters, are the tendency to oxidize and degrade in use causing the resistivity to increase unacceptably, and an inherently high ratio of room temperature resistivity to resistivity of elevated temperature e.g. 1200° C. which requires a high energy input to get the resistor up to the desired temperature. The ceramic ignite taught by U.S. Pat. No. 4,120,827 suffers from both of the foregoing shortcomings. Because it is composed of essentially only silicon carbide, it oxidizes. The patented igniter in some cases has a ratio of room temperature to elevated temperature resistivities of 5.5 which is good relative to other prior art devices but is still undesirably high in applications requiring a rapid response time i.e. heating time from room temperature to 1200° C.

It has now been found that the deficiencies of the prior art are greatly minimized by utilizing the composition of the present invention. Electrical igniters with ratios of room temperature resistivity to resistivity at rial densities assuming the law of mixtures.

For a successful fuel igniter for gas stoves, for example, so-called cold ends are absolutely necessary. Terminal ends or cold ends are made cold by making them much more conductive than the hot-zone. This can be done, for example, by impregnating the terminal ends with metal, or, by varying the composition of a monolithic ceramic resistor from the hot zone out to the terminal ends, with a gradually changing ceramic composition starting with a high resistivity formulation in the hot-zone of the resistor working out to a highly conductive composition in the terminal ends. The present invention favors the latter approach. To accomplish that end the present igniters preferably have cold ends (terminal ends) made up of 40% to 60% of a nitride, 5% to 30% of silicon carbide and 30% to 50% of molybdenum disilicide and a hot-zone made up of 40% to 60% of a nitride, 10% to 40% of silicon carbide and 5% to 20% of molybdenum disilicide. The compositional transition from the hot-zone into the cold ends may be an abrupt one or a gradual one. When using some compositions of the present invention, a gradual compositional transition is desirable to avoid problems caused by differences in coefficients of thermal expansion of the two zones. On the other hand some compositions are so similar in coefficients of thermal expansion that an abrupt compositional change can be used. Another method for creating cold ends is to design the igniter such that the volume of the terminal ends is at least 5 times greater than the volume of the hot-zone and preferably 5 to 10 times greater.

The preferred nitride is aluminum nitride. To acquire the optimum density and electrical properties the particle sizing of the powders, including the silicon carbide, molybdenum disilicide and sintering aid is not critical except that the particle sizes should be fine enough to allow the resistor itself or the billet from which a heating element or igniter is to be machined, to be pressed to near theoretical density. A suitable particle sizing for the materials involved is an average particle size of 3 microns and finer for all materials.

The electrical resistor of the invention can be any one of variety of configurations, depending on its intended end use. It may be very simple in shape such as a straight rod shape with the cold ends or terminal connecting ends on the opposite ends of the body such as that of U.S. Pat. No. 3,252,827. On the other hand the shape could be more complex such as those shown in U.S. Pat. Nos. 3,875,477 and 3,875,476 and Canadian Patent 1,058,673. For use in a gas range for example, a small 1½ inch (4 cm) long ¼ inch (½ cm) wide and 0.4 inch (0.1 cm) thick igniter in a horseshoe or hairpin shape would be most suitable because of stringent space restrictions. However, other configurations may be more desirable in other applications as for example in a clothes drier where the igniter may have to withstand occasional high mechanical forces in which case any igniter shape such as that taught by U.S. Pat. No. 3,875,477.

Because electrical resistivity may be varied over several orders of magnitude, configurations may be designed to accommodate the application rather than the electrical characteristics of the material as is frequently found with silicon carbide igniters. For example, high voltage, low power systems could be designed with reasonable, easily machinable dimensions instead of thin very long rods or coiled wire. A 50 watt igniter operating at 220 volts could be a hairpin with a hot zone 2.1 cm long for each leg with leg width of 0.16 cm and thickness of .06 cm. This igniter would require a resistivity of 2.2 ohm cm which would be achieved by a mixture of 50 volume % AlN, 7.8 volume % $MoSi_2$ and 42.2 volume % SiC. Similarly a low voltage, low power igniter may be designed as a hairpin with a hot zone leg length of 1.0 cm, a leg width of 0.15 cm and a thickness of 0.063 cm. This igniter would operate at 24 volts and 24 watts. A resistivity of 0.09 ohm cm would be achieved by a mixture of 60 volume % AlN, 15.4 volume % $MoSi_2$, and 24.6 volume % SiC.

An extremely important feature of the electrical device of the invention, particularly in the form of an igniter for fluid fuels, is that because of close control over the resistivity, igniters can be designed to have strong, practical shapes and avoid the large blocky shapes or wire thin configurations which would be necessary using the compositions of the prior art. The practical hot zone of an igniter according to the invention may be defined as follows:
(1) Thickness or width with a minimum of 0.020 in or a minimum cross-sectional area of 0.0004 $in^2$.
(2) Thickness or width with a maximum of 0.050 or a maximum cross-sectional area of 0.0025 $in^2$.
(3) For thin cross-sections, a hot zone length of a maximum of about 1 in with a ratio of length:area no greater than about 2500@0.004 $in^2$.
(4) For stubby shapes, a hot zone length of at least 0.2 inch as a practical limit.

Such igniters would have the following characteristics:

| Size | Area | Ratio | Volts | Resistivity | Watts | Temp. |
|---|---|---|---|---|---|---|
| .2" × .050" × .050" | .0025 $in^2$ | 80 | 110 | 34.6 | 12.1 | 1350 |
| " | " | 80 | 12 | .412 | 12.1 | 1350 |
| 1.0 × .020" × .020" | .0004 $in^2$ | 2500 | 110 | .589 | 21.0 | 1350 |
| " | " | 2500 | 12 | .007 | 21.0 | 1350 |

The present electrical device can be further improved by providing a protective coating thereon. If a resistor of the invention is heated at 1300° C. for 6 hours in air, a protective coating of what is believed to be a mixed oxide is formed on the surface. This coating prevents oxidation of the main body of the resistor particularly the molybdenum disilicide which can undergo oxidation at 400°-500° C. which can result in an undesirable volume change. Another approach is coating an igniter, for example, with very fine silicon carbide followed by oxidation of the coating to silica. Still a third means of enhancing the life of a resistor is to coat it with either silicon nitride or silicon oxynitride providing such coating is impervious to air.

A very critical property of an igniter, especially if gas is the fuel, is the heat up time i.e. the time for the hot-zone of the igniter to get from room temperature to the ignition temperature of the gas. This is controlled primarily by the ratio of room temperature resistivity to resistivity at 1200° C.; the higher that ratio the longer the heat up time. U.S. Pat. No. 4,205,363 boasts of ratios less than 12, preferably 9 and contains an example where said ratio was as low as 5.5. The same ratio for igniters of the present invention can easily be designed to be less than 5 and as low as 0.2 thus providing igniters with very rapid response or heat up times. Similarly, because igniters are small, mechanical strength becomes important. The composition of the present invention results in an igniter with a modulus of rupture at room temperature using 2 inch (5.08 cm) span with 3 point loading of about 66,000 psi (450 MPa) when the mixture of nitride, carbide and silicide is hot pressed to 99.7% of theoretical density.

Probably the single most important feature of the invention igniter is an unusually low power load per unit area of radiating surface. Igniters made according to the invention consume only about 20 to about 60 watts per square centimeter of radiating surface at 1200° C. To radiate at 1200° C. the hot zone of the igniter requires a load of 34.5 watts/$cm^2$ as shown in Example I below and 24.1 watts/cm² as shown in Example II below. Igniters made according to U.S. Pat. No. 4,205,363 require a load of 60 to 100 watts per centimeter. More specifically, the device of Example 2, of that patent requires 82.6 watts/cm² to operate at a similar temperature; Example 3 requires 63.6 watts/cm². The lower load value for the invention igniter means that such an igniter can operate at the desired temperature with 2 to 3 times the radiating surface. This in turn allows igniters to be used that are larger in size and consequently stronger than the fragile prior art igniters such as the essentially hair like igniter of U.S. Pat. No. 4,205,363.

The commercial success of a ceramic igniter is dependent on that devices ability to survive for long periods of time in a very hostile environment without being physically destroyed. A gas igniter for a gas range, for example, should be able to withstand numerous heat-up and cool-down cycles; it should also be able to survive many hours exposure to elevated temperatures and the chemical environment of a gas flame. The present igniters can easily undergo 120,000 cycles and prolonged exposure to a gas flame for over 4000 hours without significant physical damage. However, resisting physical damage is only part of the survival characteristics required in a successful igniter. The other part is the ability of the igniter to go through the foregoing severe and prolonged exposure without a drastic change in the ratio of room temperature resistivity to resistivity of 1200° C., for the reason stated above. Because the resistors of the invention are so stable to deterioration the ratio remains relatively constant.

EXAMPLES OF THE PREFERRED EMBODIMENTS

Example I

Figure 1:
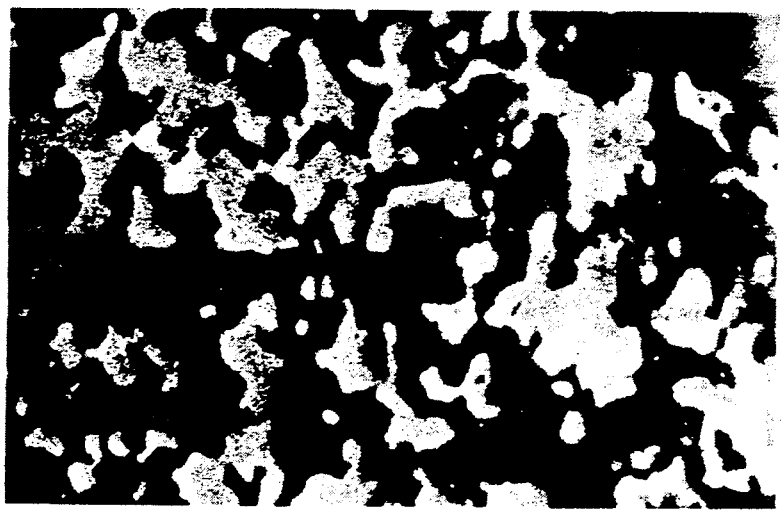
FIGS. 1 and 2 are scanning electron microscope (SEM) photomicrographs of two different compositions of the invention, taken at 2000×.
Figure 2:
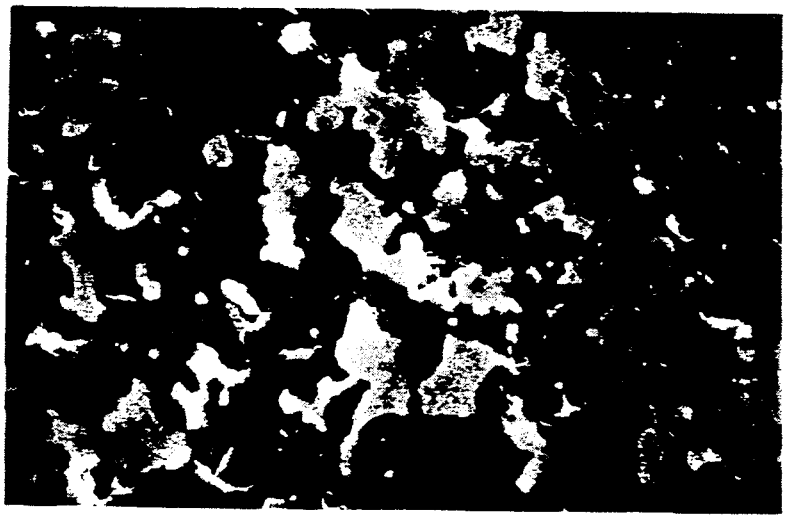
Figure 3:
FIG. 3 is a scanning electron microscope (SEM) photomicrograph of the composition of FIG. 2 taken at 17000×.
Figure 4:
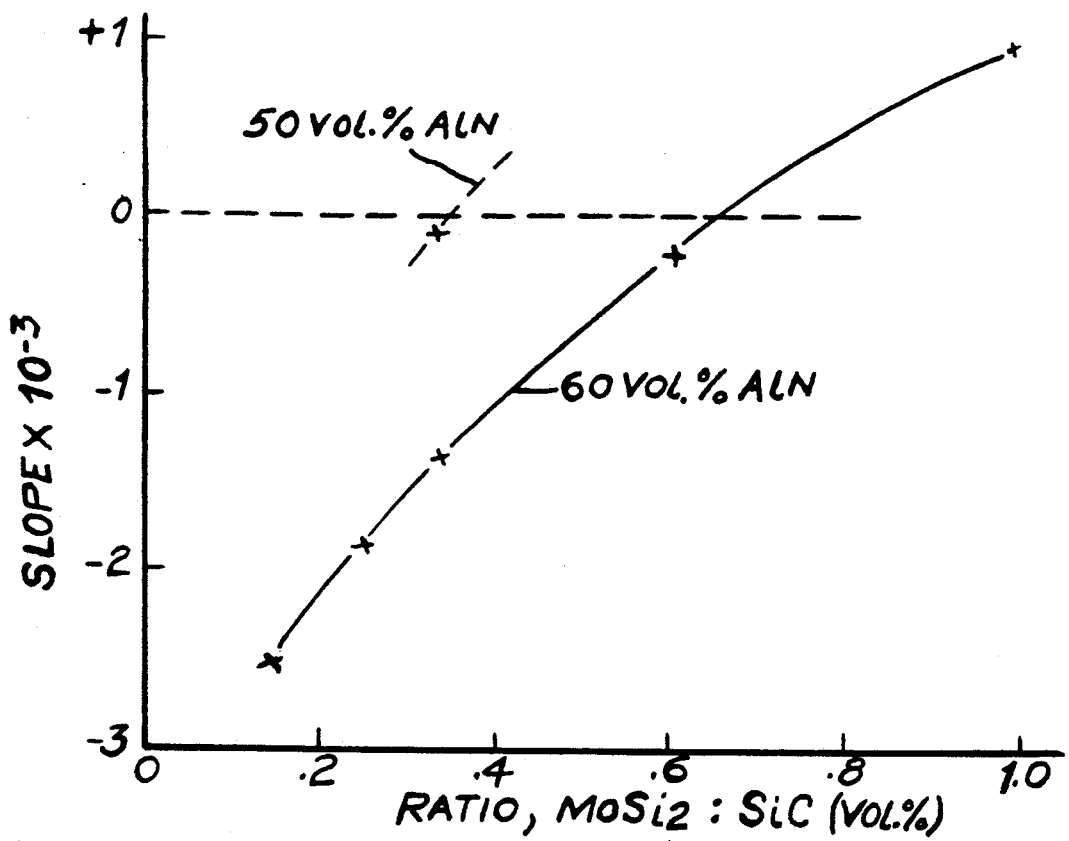
FIG. 4 graphically shows the relationship between the slope of the resistivity curve and the ratio of $MoS_2$:SiC.
Figure 5:
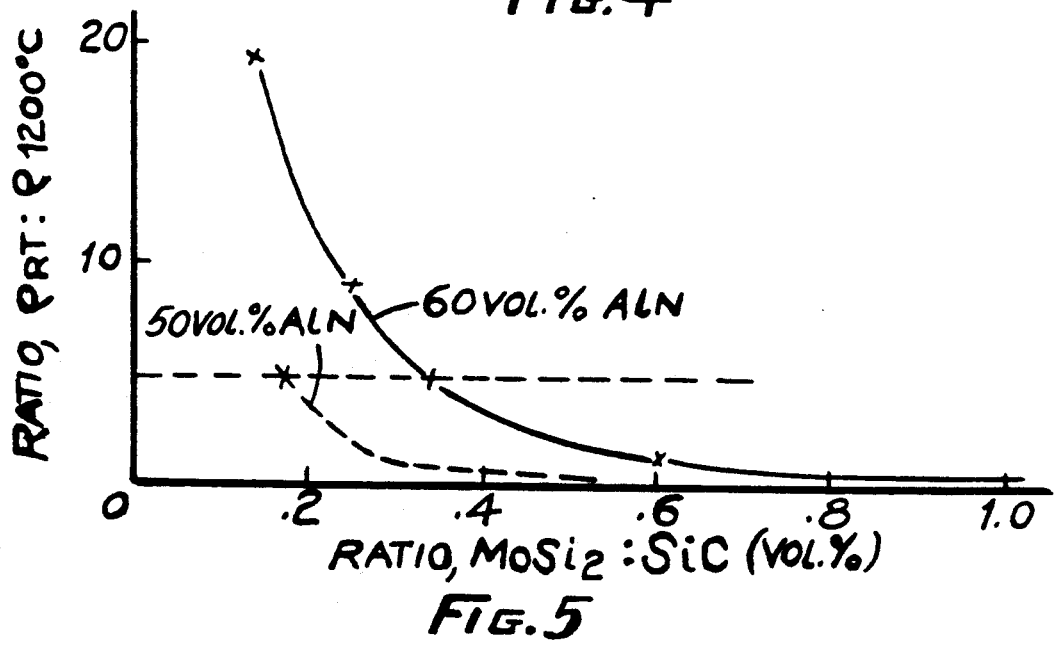
FIG. 5 graphically shows the relationship of the ratio of hot resistivity to cold resistivity as a function of $MoS_2$: SiC.

Two igniters were fabricated and compared in use. One was a silicon carbide—silicon nitride igniter made according to the Richerson patent U.S. Pat. No. 3,890,250 and the other was made according to the present invention.

A mixture of 60% by weight of silicon nitride and 40% by weight of silicon carbide, according to the Richerson patent, was hot pressed into a billet to a density of 3.08 Mg/m³. The mixture was made up of 3 micron silicon nitride containing 2.5% magnesium carbonate and 3 micron silicon carbide containing 0.8% of aluminum and hot pressed at 1775° C. From the billet an igniter was machined with a hot-zone which measured 0.104 cm×0.106 cm×2.46 cm long which had a resistivity at room temperature of 1.60 ohm-cm and at 1200° C. a resistivity of 0.82 ohm-cm. The igniter was life tested at 1200° C. and it was found that after only 311 hours the resistance of the hot-zone at 1200° C. had increased from 182.4 ohms to 274.4 ohms, an increase of 35.6%. The resistance of the cold ends and electrical connections increased from 40.4 ohms to 154.4 ohms or a change of 282%. It was found that by mixing a substantial quantity of molybdenum disilicide with the silicon carbide, and blending with silicon nitride many of the problems with low density, hot-zone degradation, and high resistance of the cold ends, were overcome.

A mixture of 58.5% silicon nitride 30% silicon carbide, 10% molybdenum disilicide, and 1.5% magnesium carbonate was prepared as follows: The silicon nitride was made from 3 micron silicon and was about 95% alpha silicon nitride. This was blended with reagent grade $MgCO_3$ powder in isopropyl alcohol in a blender. The silicon carbide used was 3 micron material and was balled milled with finer than 200 mesh molybdenum disilicide for 7-8 hours in isopropyl alcohol using tungsten carbide milling balls. The two mixtures were then blended by rolling together in a ball mill for 30 minutes. This was done to insure that the conductive matrix of silicon carbide and molybdenum disilicide was a homogeneous mixture and yet had a coarse structure without a lot of fine bridges when combined with the silicon nitride. A disc measuring 7.62 cm in diameter and 0.79 cm thick was hot pressed using 155 g of the above mixture dried. The pressing was done in a graphite mold at 1775° C. and a load of 8 Mg with a soak at 1775° C. of approximately one hour. The density of the pressed mixture was 3.356 Mg/m³ with theoretical density being 3.366 Mg/m³; the pressed piece was 99.7% of theoretical. An igniter was machined from this billet or disc. It had a hot-zone measuring 3.18 cm×0.12 cm×0.06 cm with a tab on each end measuring 1.91 cm×0.7 cm×0 06 cm. The ratio of cross section of the cold ends to the cross section of the hot zone was about 11 to 1. The igniter was placed in a furnace and heated at 1300° C. in air for 6 hours. This produced a thin oxide protective coating on the igniter.

Electrical contacts were made on the tabs by first machining 0.25 cm wide by 0.63 cm in from the ends. The igniter was then masked so that only the slotted ends were exposed and the protective oxide film was sand blasted off the exposed ends. A machine screw 2-56×½" and 4 Belleville washers and a nut were assembled and tightened in the slot on each end. The four washers flattened with a load of 40 kg; a section of 0.3 mm nickel wire was looped around the screw and held in place with a second nut; the wire was connected electrically. Resistivity at room temperature was 0.252 ohm-cm and dropped to a minimum of 0.146 at 1100° C. then increased to 0.148 ohm-cm at 1300° C. The ratio of resistivities at room temperature to 1200° C. was 1.7.

A life test was run at 1200° C. in air comparing the igniter according to the Richerson patent (Prior Art) and the above invention igniter with the following results:

|  | Prior Art | Invention |
|---|---|---|
| Size of hot zone: | | |
| Width × thick (cm²) | .104 × .106 | .109 × .064 |
| length (cm) | 2.46 | 3.18 |
| Total voltage at start | 86.0 | 56.8 |
| Total amperage at start | .386 | .754 |
| Total power at start (watts) | 33.2 | 42.8 |
| Power for hot zone (watts)$P_H$ | 27.1 | 38.0 |
| Hot zone resistance start, $R_H$ | 182.4 | 66.8 |

-continued

|  | Prior Art | Invention |
| --- | --- | --- |
| Hours of operation | 311 | 908 |
| Hot zone resistance at end, $R_H$ | 247.4 | 70.5 |
| % $R_H$ | 35.6 | 5.5 |
| % $R_H$/hr | 0.114 | 0.006 |

These data show that the aging of the invention igniter is considerably less than that of the Prior Art igniter. The resistance change for the invention igniter took place essentially during the first 30 hours when the total change was only 7%. There was essentially no change for an additional 500 hours after which the resistance slowly decreased by about 5.5% based on the original resistance after 908 hours. The igniter actually became more conductive with time at 1200° C. The voltage remained stable after a slight initial increase from 56.2 to 57.0 volts; this was due to a small increase in the resistance of the cold ends. The cold ends operated at a temperature of 260° C. and were stable after the initial 125 hours with essentially no further change taking place. The resistance of the cold ends of the invention igniter decreased from 8.5 ohms to 5.8 ohms after the first 56 hours, showed an increase to 6.6 ohms after 160 hours remaining steady for 600 hours, after which the resistance gradually increased to 7.5 ohms at the 908th hour. The invention igniter changed a total of 29% while the Prior Art igniter changed resistance by 282%. Furthermore, the cold ends or tabs of the Prior Art device were running at 394° C. and 456° C. while the invention igniters cold ends remained at 280° C. and 250° C.

Example II

A double-legged dual composition hairpin or U-shaped igniter made up of aluminum nitride, silicon carbide and molybdenum disilicide was fabricated in the following manner:

Two batches of 101.8 grams and 90.4 grams of through 325 mesh aluminum nitride were ball milled in isopropyl alcohol for 1 hour using a tungsten carbide lined mill and tungsten carbide milling media. Two mixtures of 98.2 grams and 139.6 grams of molybdenum disilicide and silicon carbide were prepared in the same way; the first of these mixtures was made up of 75% molybdenum disilicide and 25% silicon carbide, and the other mixture was 50% molybdenum disilicide and 50% silicon carbide, all percentages being by volume. Two mixtures containing all three materials were prepared to give one with 50-30-20 and the other 60-20-20 volume percent aluminum nitride, molybdenum disilicide and silicon carbide respectively. 40 grams of the high silicon carbide mixture and 47.2 grams of the high molybdenum disilicide mixture in the form of alcohol slips were placed side-by-side in a graphite mold in the form of slips with a graphite spacer between the two; the mold had a cavity measuring 2"×2.5" (5.08 cm×6.35 cm). The alcohol was removed, and the materials were hot pressed, after completing the assembly of the mold at about 1.2 tons/in² (16.6 MPa) and 1760°–1820° C. in an argon atmosphere to maximum contraction followed by a 60 minute hold. A double-legged hairpin or U-shaped igniter was machined from the billet with the high silicon carbide mix making up the hot zone and the high molybdenum disilicide material being in the legs or terminal connecting ends. The hot-zone measured 1.4 cm×0.242 cm×0.061 cm. The igniter was given a protective glaze or coating by firing it in air at 1350° C. for about 6 hours. The device was electrically connected with alligator clips and caused to heat up to 1200° C.; it was allowed to maintain this temperature for a total lift test of 1988 hours. The resistivity at room temperature was 0.0073 ohm-cm and 0.019 ohm-cm at 1200° C.; at the start the voltage was 13.71, power at 1200° C. was 16.6 watts and the load at 1200° C. was 24.1 watts/cm². The terminals were stable and remained at a relatively constant temperature of 120° C. for 1988 hours. During the life test the total change in resistance was 0.06% of which the hot zone gained 1.64% and the terminal connection lost 1.70%.

What is claimed is:

1. An igniter for fluid fuels comprised of a hot zone and cold ends consisting essentially of a sintered mixture of 5 to 50% by volume of molybdenum disilicide and 50 to 95% by volume of a mixture of silicon carbide and silicon nitride; 4% or less of open porosity, a room temperature flexural strength of at least 30,000 psi (207 MPa), a resistivity range of from 0.0001 to 90 ohm centimeters, a ratio of room temperature resistivity to that at 1200° C. of from 0.2 to 19.8, a response time from room temperature to about 1200° C. of less than 25 seconds, said igniter consuming from about 20 to about 50 watts per square centimeter of radiating surface at 1200° C.

2. The igniter of claim 1 wherein said igniter consists essentially of 30% to 70% by volume of a silicon nitride, 5% to 40% by volume of silicon carbide, 5% to 50% by volume of molybdenum disilicide, and 0 to 3% by weight of a sintering aid.

3. The igniter of claim 1 wherein the composition varies from the hot zone to the cold ends such that said cold ends are made up of all molybdenum disilicide.

4. The igniter of claim 3 wherein the composition changes gradually from hot zone to cold ends.

5. The igniter of claim 3 wherein the composition varies abruptly from hot zone to cold ends.

6. The igniter of claim 3 having cold ends and a hot zone with a resistivity differential therebetween which is the result of said cold ends being made up of 30% to 70% by volume of said nitride, 5% to 30% by volume of silicon carbide, and 30% to 50% by volume of molybdenum disilicide; and said hot zone is made up of 30% to 70% by volume of said nitride, 10% to 40% by volume of silicon carbide, and 5% to 20% by volume of molybdenum disilicide.

7. The igniter of claim 3 wherein said igniter is formed from 40% to 70% by volume of silicon nitride powder having an average particle size of about 3 microns, 10% to 40% by weight of silicon carbide having an average particle size of about 3 microns, 5% to 30% by weight of molybdenum disilicide having a particle size of about 3 microns and 0.5% to 3.0% by weight of a source of magnesium oxide having an average particle size of about 3 microns, and wherein said igniter has a density of at least 2.62 Mg/M³.

8. The igniter of claim 1 having cold ends and a hot zone wherein the resistance differential between the cold ends and the hot zone is a result of the cold ends having a volume 5 to 10 times greater than the volume of the hot zone.

9. The igniter of claim 1 which is provided with a protective mixed oxide coating.

10. The igniter of claim 1 which includes a protective coating thereon selected from the group consisting of silica, silicon oxynitride and silicon nitride.

11. The igniter composition of claim 1 made up of two separate but intertwined structures including a first dense continuous phase made up of silicone nitride and a second dense continuous phase made up of a mixture of silicon carbide and molybdenum disilicide.

* * * * *